(12) United States Patent
Smith

(10) Patent No.: US 11,570,226 B2
(45) Date of Patent: Jan. 31, 2023

(54) PROTOCOL CONVERSION OF A VIDEO STREAM

(71) Applicant: Smarthome Ventures, LLC, Kansas City, MO (US)

(72) Inventor: Jeff Smith, Overland Park, KS (US)

(73) Assignee: Smarthome Ventures, LLC, Kansas City, MO (US)

( * ) Notice: Subject to any disclaimer, the term of this patent is extended or adjusted under 35 U.S.C. 154(b) by 0 days.

(21) Appl. No.: 17/730,558

(22) Filed: Apr. 27, 2022

(65) Prior Publication Data

US 2022/0255978 A1 Aug. 11, 2022

Related U.S. Application Data

(63) Continuation of application No. 16/421,621, filed on May 24, 2019, now Pat. No. 11,349,899.

(60) Provisional application No. 62/676,153, filed on May 24, 2018.

(51) Int. Cl.
*H04L 65/65* (2022.01)
*H04L 65/70* (2022.01)
*H04L 65/75* (2022.01)

(52) U.S. Cl.
CPC .............. *H04L 65/65* (2022.05); *H04L 65/70* (2022.05); *H04L 65/75* (2022.05)

(58) Field of Classification Search
CPC ... H04L 65/608; H04L 65/601; H04L 65/607; H04L 65/4069; H04L 65/65; H04L 65/70; H04L 65/75; H04L 65/765; H04L 65/61
USPC ...................................................... 709/231
See application file for complete search history.

(56) References Cited

U.S. PATENT DOCUMENTS

| | | | | |
|---|---|---|---|---|
| 8,862,762 | B1* | 10/2014 | Motrenko | H04N 21/41407 709/230 |
| 2007/0162571 | A1* | 7/2007 | Gupta | H04N 21/2343 348/E5.002 |
| 2009/0147787 | A1 | 6/2009 | Arulambalam et al. | |
| 2012/0191805 | A1* | 7/2012 | Fee | H04N 21/64738 709/217 |
| 2013/0282874 | A1 | 10/2013 | Swenson et al. | |
| 2014/0075015 | A1* | 3/2014 | Chan | H04L 41/22 709/224 |

(Continued)

OTHER PUBLICATIONS

International Search Report and Written Opinion in corresponding PCT/US2019/034012, 7 pages.

(Continued)

*Primary Examiner* — Tan Doan
(74) *Attorney, Agent, or Firm* — Hovey Williams LLP

(57) ABSTRACT

Aspects of the technology described herein are directed towards systems, methods, and computer storage media for, among other things, converting a video stream being transmitted in a first streaming protocol to a second streaming protocol without transcoding the content communicated in the video stream. For example, the technology described herein may convert an RTP video stream to a non-RTP video stream without transcoding. The technology described herein extracts a plurality of media content from an RTP package and repackages the extracted content into a non-RTP streaming protocol, such as WebRTC or HLS. Moreover, the technology described herein can provide for the synchronization of video and audio data during conversion.

20 Claims, 6 Drawing Sheets

(56) References Cited

U.S. PATENT DOCUMENTS

2016/0119399 A1 4/2016 Glass
2018/0213295 A1 7/2018 Song et al.

OTHER PUBLICATIONS

Flashphoner, "Browser-based WebRTC stream from RTSP IP camera with low latency", 2019, retrieved from: https://flashphoner.com/browser-based-webrtc-stream-from-rtsp-ip-camera-with-low-latency/.

Office Action in corresponding U.S. Appl. No. 16/421,621, dated Oct. 30, 2020.

Office Action in corresponding U.S. Appl. No. 16/421,621, dated Apr. 29, 2021.

Office Action in corresponding U.S. Appl. No. 16/421,621, dated Sep. 2, 2021.

* cited by examiner

PROTOCOL CONVERSION OF A VIDEO STREAM

CROSS-REFERENCE TO RELATED DOCUMENTS

The current patent application is a continuation patent application which claims priority benefit to identically-titled U.S. patent application Ser. No. 16/421,621, filed May 24, 2019, which, itself, claims priority to U.S. Provisional Patent Application Ser. No. 62/676,153, filed May 24, 2018, entitled PROTOCOL CONVERSION OF A VIDEO STREAM, and each of the foregoing applications is hereby incorporated by reference in their entireties into the current patent application.

BACKGROUND

Video streaming is a staple of a modern life. Video is regularly streamed from mobile devices to a plurality of viewers, as embodied by services such as Facebook Live or Periscope. More traditional video monitoring devices such as baby monitors and surveillance cameras are routine sources for video to streaming clients. Finally, video chatting, whether personal or for business, passes streaming video and audio between at least two users. These are just some of the many ways in which video is streamed from at least one source to at least one viewer.

Substantial numbers of cameras rely on the Real Time Streaming Protocol (RTSP) to control how video information is processed. In the past, many web browsers finely permitted plugins to display RTSP video. Claiming various concerns, some web browsers such as Mozilla Firefox and Google Chrome have defaulted to disallow plugins, inherently limiting a browser-user's ability to view RTSP video. Conventional techniques of converting RTSP to plugin-free protocols such as WebRTC and HLS requires transcoding, a time and resource intensive endeavor.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed towards systems, methods, and computer storage media for, among other things, converting a video stream being transmitted in a first streaming protocol to a second streaming protocol without transcoding the content communicated in the video stream. For example, the technology described herein may convert an RTP video stream to a non-RTP video stream without transcoding. The technology described herein extracts a plurality of media content from an RTP package and repackages the extracted content into a non-RTP streaming protocol, such as WebRTC or HLS. Moreover, the technology described herein can provide for the synchronization of video and audio data during conversion. Converting a video without transcoding, while selectively maintaining video and audio synchronization can be used to decrease conversion resources and decrease buffering and lag.

BRIEF DESCRIPTION OF THE DRAWINGS

Aspects of the invention are described in detail below with reference to the attached drawing figures, wherein.

DETAILED DESCRIPTION

Figure 1:
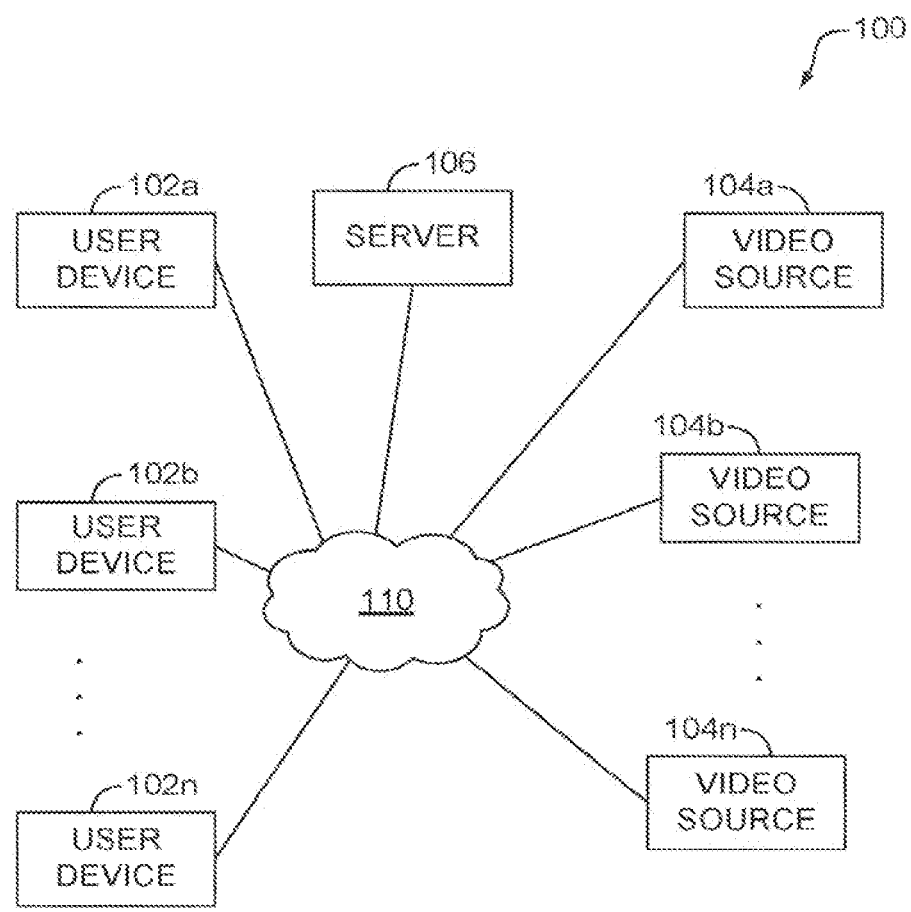
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, converting a video stream being transmitted in a first streaming protocol to a second streaming protocol without transcoding the content communicated in the video stream. For example, the technology described herein may convert an RTP (Real-Time Transfer Protocol) video stream to a non-RTP video stream without transcoding. The technology described herein extracts a plurality of media content from an RTP package and repackages the extracted content into a non-RTP streaming protocol, such as WebRTC or HLS. Moreover, the technology described herein can provide for the synchronization of video and audio data during conversion. Moreover, the technology described herein can provide for the synchronization of video and audio data during conversion. The correlated audio and video data may be configurably synched or unsynched as best-suited for the user's purpose. Furthermore, the technology can comprise a first buffer for typical forward-streaming video and a second buffer used for reverse video playback.

Converting a video without transcoding, while selectively maintaining video and audio synchronization can be used to decrease conversion resources and decrease buffering and lag.

Video Stream: as used herein refers to a content delivery method where video content (and optionally audio content and media controls) is communicated from a video source to a client device over a network communication session for "just in time" presentation to a user of the client device. Streaming a video contrasts with downloading a video file in its entirety before watching it. Downloading a video file is a different content delivery method. The video content may be presented through the client device by a media player application, such as an Internet browser or media player.

Aspects of the technology described herein can be used to convert a live stream or a recorded stream. As used herein, a live stream refers to video content that is transferred from the source camera to a client device within a threshold time period of capturing the video content. Generally, the threshold time period is quite short, such as a few seconds. In one aspect, the threshold time is less than the length of the video content. In other words, the start of a video content is communicated to the client before the content capture is completed, for example, when a sporting event concludes. A recorded stream refers to streaming a previously created video that has been stored in computer storage.

Video streaming may be implemented using a series of protocols, not all of which are described herein. First, the video content is encoded using a content encoding protocol. Generally, the content encoding protocol compresses the video content for transport over a computer network. Exemplary video encoding protocols include, but are not limited to, H.261, H.263, H.264, HEVC, MPEG-1/MPEG-2. VP8, and VP9. Exemplary audio encoding protocols include, but are not limited to, G.711, G.723. G.726, G.729, GSM, QCELP, MP3, and DTMF.

Video encoding can occur using i-frames, p-frames, and b-frames. I-frames are a complete image, whereas p-frames and b-frames are referential images that only describe differences between it and another image. A p-frame includes differences from a previous frame. A b-frame includes differences between both a preceding frame and a subsequent frame. The frames can be packaged in a group of pictures ("GOP") structure. The GOP structure dictates the order of frames within the GOP. In one example, the GOP starts and ends with an i-frame. For example, the GOP structure could be IBBPBBPBBPBBI.

A transport protocol can used to transport the encoded video packets between devices. For example, RTP can run on the UDP transport protocol.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of video sources, such as video sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented.

Video sources 104a and 104b through 104n may comprise video sources and/or video systems, which are configured to make video available to any of the various constituents of operating environment 100, or system 200 described in connection to FIG. 2. (For example, in one aspect, one or more video sources 104a through 104n provide (or make available for accessing) protocol transfer component 280 of FIG. 2.) Video sources 104a and 104b through 104n may be discrete from user devices, such a phone, laptop, head mounted display, or tablet having a camera. In one aspect, one or more of video sources 104a through 104n comprises one or more standalone cameras, such as security cameras, baby monitoring cameras, doorbell cameras, and the like.

Figure 2:
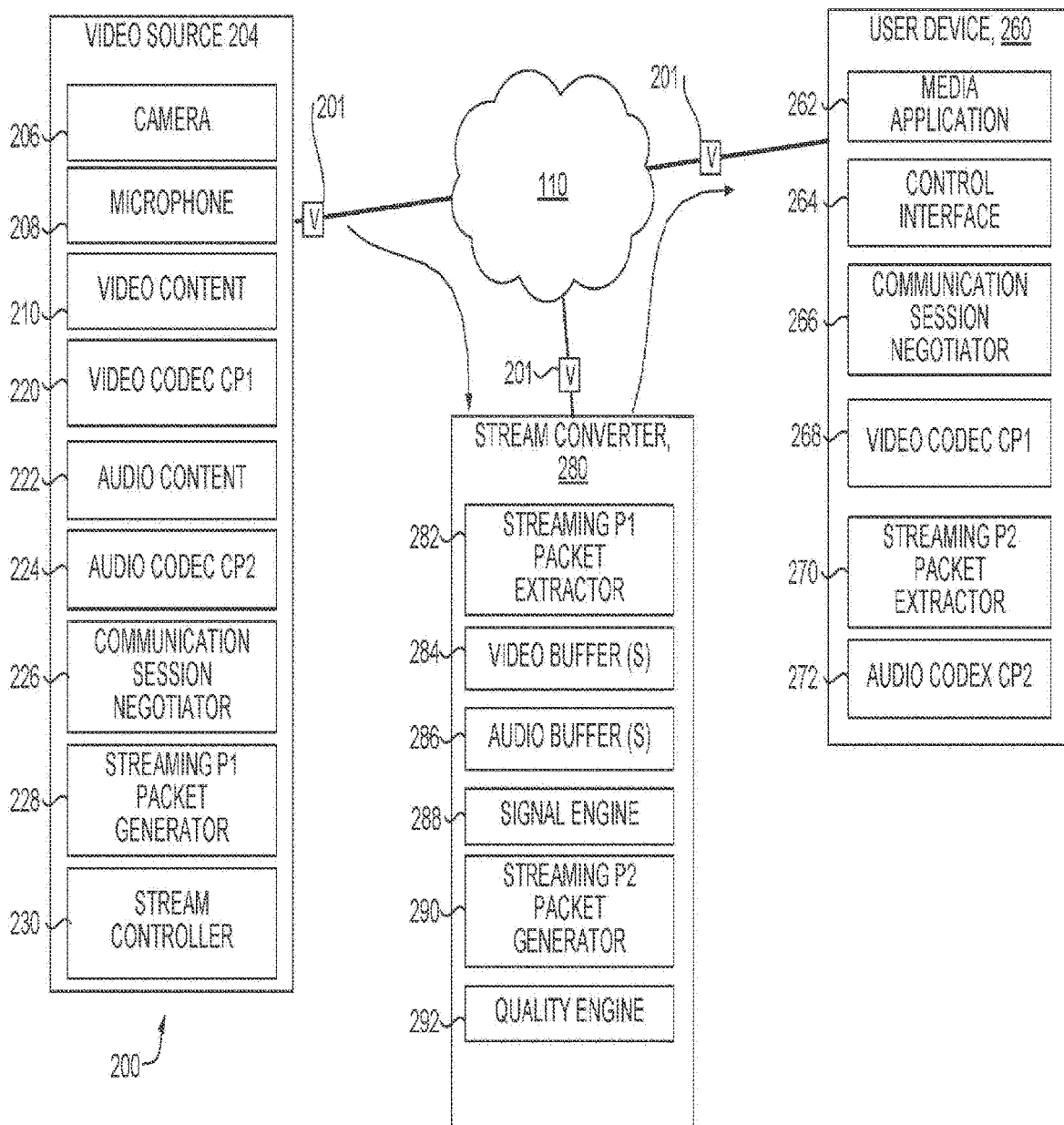
FIG. 2 is a diagram depicting an example computing architecture suitable for implementing aspects of the technology.

Operating environment 100 can be utilized to implement one or more of the components of system 200, described in FIG. 2, including components for receiving a video stream in a first protocol, decoding the first protocol to extract video packets encoded according to a first encoding protocol, and repacking the video packets into a second transport protocol without transcoding. Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data video source 204, stream converter 280, and user device 260. Stream converter 280 (including its components 282, 284, 286, 288, 290, and 292), user device 260 (including its components 262, 264, 266, 268, 270, and 272), video source 204 (including its components 206, 208, 210, 220, 222, 224, 226, 228 and 230), may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer (s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, video content 201 is communicated from the video source 204, to network 110, to the stream converter 280, back to network 110, and finally to the user device 260. The stream converter 280 converts the stream content from a first streaming protocol to a second streaming protocol without transcoding media content. Conversion of a video stream may be necessary when a user device does not have a media application that is compatible with a particular streaming protocol. In this case, the stream converter 280 may be used to allow the video source 204 to stream media content to user device 260 by converting the video stream from a first protocol to a second protocol.

The video source 204 may be similar to the video sources 104(a)-104(n) described previously. For example, the video source 204 could be a camera, such as a security camera or baby monitor, that is live broadcasting content into a video stream. As another example, the video source could be a media server that streams recorded content to one or more user devices.

The video source 204 includes a camera 206, a microphone 208, a video content 210, a video codec 220, audio content 222, an audio codec 224, a communication session negotiator 226, a packet generator for a first streaming protocol 228, and a stream controller 230.

The video content 210 is generated by the camera, in the example shown in FIG. 2. It may be buffered or otherwise stored briefly as it is processed for input into the video stream. The raw video content 210 may be captured in any number of different video formats. However, it may be encoded into a content protocol suitable for use in a video stream. Suitable content protocols will typically compress the video data.

The video codec for a first content protocol 220 converts the raw data of video content 210 into a first content protocol, such as H.261, H.263, H.264, HEVC, MPEG-1/ MPEG-2, VP8, and VP9. The result of the encoding work done by the video codec 220 can be a series of video frames. The video frames may be grouped into a GOP of frames. The GOP can include i-frames, b-frames, and p-frames.

The audio content 222 may be captured by the microphone 208 at the same time video is captured by the camera 206. Like the video content, the audio content 222 may be stored briefly for processing.

The audio codec 224 is for a second content protocol for audio and converts the raw audio captured by the microphone 208 into an audio content format consistent with the second content encoding protocol. Exemplary audio encoding protocols include, but are not limited to, G.711, G.723, G.726, G.729, GSM, QCELP, MP3, and DTMF.

The communication session negotiator 226 establishes a communication session between the video source 204 and the user device 260. The communication session may include the stream converter 280. Alternatively, separate communication sessions may be established between the video source 204 and the stream converter 280 and a separate session between the stream converter 280 and the user device 260.

The packet generator for a first streaming protocol 228 takes the audio content and the video content and packages it into data packets consistent with the first streaming protocol, for example, RTP. The audio content may be packaged separately from the video content. For example, packet generator may package the media content into RTP packets.

The stream controller 230 can respond to control signals, such as those provided over the RTSP, to alter the media presentation. For example, the stream controller 230 can pause the stream, stop the stream, fast-forward the stream, and the like.

The stream converter 280 includes an extractor 282 compatible with the first streaming protocol, video buffers 284, audio buffers 286, signal engine 288, a packet generator 290 that is compatible with a second streaming protocol, and a quality engine 292.

The extractor 282, which is compatible with the first streaming protocol, receives the data packets, such as RTP packets, and extracts the media payload. The extracted video payload will be in the first content protocol and the audio content will be in the second content protocol.

The video buffers 284 are located between the extractor 282 and the packet generator 290. The video buffer 284 can store video frames from the extractor 282 and perform various functions on them, such as reordering the frames according to a timestamp, sequence number, or other ordering mechanism.

The audio buffers 286 are located between the extractor 282 and the packet generator 290. The audio buffer 286 can store audio content from the extractor 282 and perform various functions on them, such as reordering according to a timestamp, sequence number, or other ordering mechanism. The video buffers 284 and audio buffers 286 may work together to synchronize audio and video content.

The signal engine 288 receives control signals from the user device 260 and converts them to a control signal that is compatible with the video source 204. For example, a control to start, stop, pause, fast-forward, rewind, skip, or the like may be converted from one format to another for consumption by the stream controller 230. Likewise, various acknowledgments, responses, or instructions from the stream controller 230 can be converted by the signal engine 288 and communicated to the user device 260.

The packet generator 290, which is compatible with a second streaming protocol, repackages the extracted audio and video content into packets compatible with the second streaming protocol. The repackaging is done without transcoding the audio or video content. In other words, the audio and video content is packaged into the second streaming protocol while remaining in the same content protocol, which in this case is the first content protocol for video and second content protocol for audio.

The quality engine 292 converts session data associated with the first streaming protocol to session data associated with a second streaming protocol. Different streaming protocols may use a streaming session channel to control or monitor the quality of the streaming session. For example, the RTSP protocol uses the RTCP protocol to control quality of service (QoS) factors.

In one aspect, RTCP controls are received by the quality engine 292 and converted to quality messages that can be sent to the user device 260. Similarly, the quality engine 292 can receive quality messages from the user device 260, translate them, and send them on to the video source 204. This allows the video source to adjust streaming characteristics based on the entire route between the video source 204 and the user device 260, instead of just between the stream converter 280 and the video source 204.

The user device 260 includes a media application 262, a control interface 264, the communication session negotiator 266, a video codec for a first content protocol 268, and a packet extractor compatible with a second streaming protocol 270, an audio codec compatible with the second content protocol 272.

The media application 262 is a computer program capable of playing media, such as music or videos. Many different media applications exist. Some work with multiple streaming and video formats, while others are only able to work with a particular protocol. Many media application include controls similar to those found on a DVD player. For example, the media application can include play, stop, pause, fast-forward, skip, rewind, and the other controls.

The control interface 264 provides an alternative control interface for the user to control the media presentation on the media application 262. The control interface 264 can be used instead of controls provided by the media application 262.

As mentioned, some streaming protocols include a control or signaling channel, such as RTSP. It may be preferable in some implementations to maintain the same control signals, rather than converting from one signal protocol to another. The control interface 264 allows the user to communicate with the video source 204, which will control the media presentation.

The communication session negotiator 266 helps establish communications sessions between components, as needed.

A packet extractor compatible with a second streaming protocol 270 removes the media payload, video and/or audio, from the data packets. For example, the payload could be removed from WebRTC packets.

A video codec for a first content protocol 268 converts the compressed video frames to a format that can be consumed by the media application 262 to present the video.

An audio codec compatible with the second content protocol 272 is used to remove the audio payload from the second streaming protocol data packet.

Figure 3:
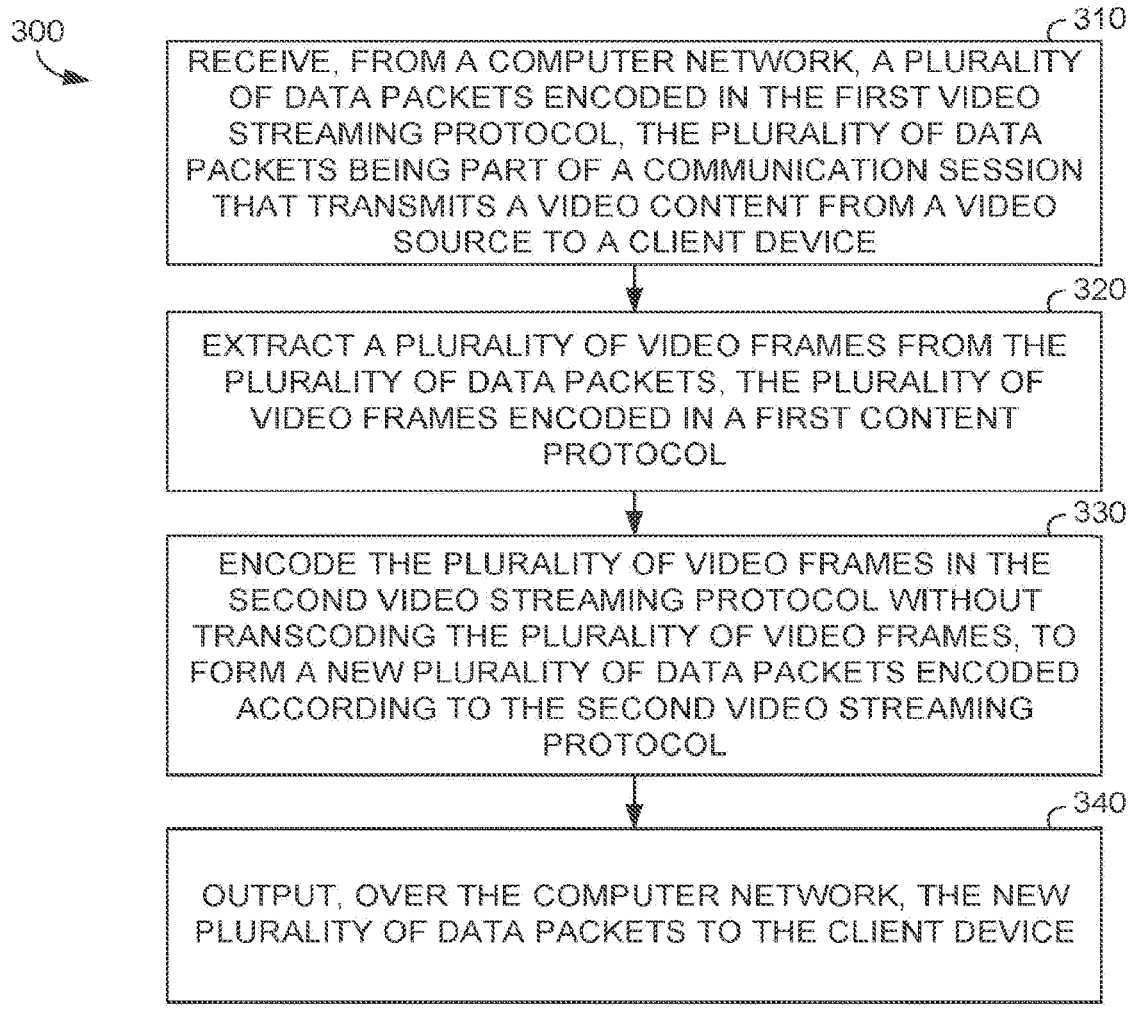
FIG. 3 is a diagram depicting a method of converting a media stream from a first streaming protocol to a second streaming protocol, in accordance with an aspect of the technology described herein.

Turning now to FIG. 3, a method 300 for converting a streaming video from a first video streaming protocol to a second video streaming protocol is provided, in accordance with an aspect of the technology described herein. Method 300 may be performed by stream converter 280.

At step 310, a plurality of data packets encoded in the first video streaming protocol are received from a computer network. The plurality of data packets are part of a communication session that transmits a video content from a video source to a client device. The packets may be received by a stream converter 280. The stream converter may be located in a data center. The video source may be a camera or device having a camera, such as a doorbell. The computer network may be the Internet. The client device could be a smart phone, PC, TV, tablet, or the like.

At step 320, a plurality of video frames are extracted from the plurality of data packets. The plurality of video frames are encoded in a first content protocol, such as H.261, H.263, H.264, HEVC, MPEG-1/MPEG-2, VP8, and VP9. The video frames may be grouped into a GOP of frames. The GOP can include i-frames, b-frames, and p-frames. When extracted the frames remain in the first content protocol, such as VP8.

At step 330, the plurality of video frames are encoded in the second video streaming protocol without transcoding the plurality of video frames to form a new plurality of data packets encoded according to the second video streaming protocol. In other words, the video frames remain in the same content protocol, but are wrapped in a different communication protocol. For example, the video frame encoded in the VP8 protocol may be extracted from a data packet encoded in RTP and then encoded in a WebRTC data packet without changing the VP8 video frame.

Prior to encoding, the frames may be buffered and subjected to various quality improvement processes. For example, the frames or GOPs could be reordered into a temporally correct order. Missing frames could be identified and requested from the video source, if not present.

At step 340, the new plurality of data packets to the client device are output over the computer network.

Figure 4:
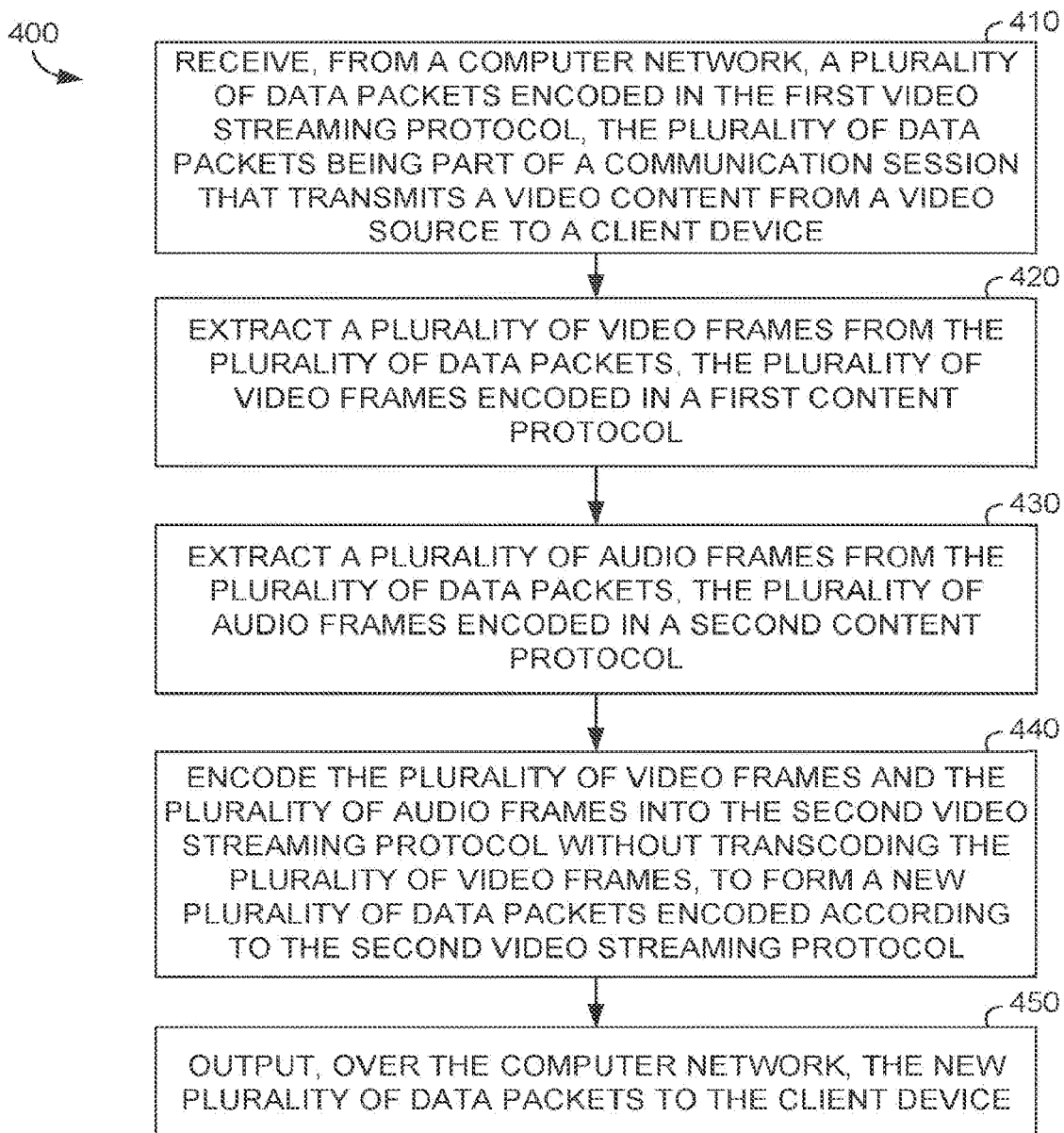
FIG. 4 is a diagram depicting a method of converting a media stream from a first streaming protocol to a second streaming protocol, in accordance with an aspect of the technology described herein.

Turning now to FIG. 4, a method 400 for converting a streaming video from a first video streaming protocol to a second video streaming protocol is provided, in accordance with an aspect of the technology described herein. Method 400 may be performed by stream converter 280.

At step 410, a plurality of data packets encoded in the first video streaming protocol are received from a computer network. The plurality of data packets are part of a communication session that transmits a video content from a video source to a client device. The packets may be received by a stream converter 280. The stream converter may be located in a data center. The video source may be a camera or device having a camera, such as a doorbell. The computer network may be the Internet. The client device could be a smart phone, PC, TV, tablet, or the like.

At step 420, a plurality of video frames are extracted from the plurality of data packets. The plurality of video frames are encoded in a first content protocol, such as H.261, H.263, H.264, HEVC, MPEG-1/MPEG-2, VP8, and VP9. The video frames may be grouped into a GOP of frames. The GOP can include i-frames, b-frames, and p-frames. When extracted the frames remain in the first content protocol, such as VP8.

At step 430, a plurality of audio frames are extracted from the plurality of data packets. Exemplary audio encoding protocols include, but are not limited to, G.711, G.723, G.726, G.729, GSM, QCELP, MP3, and DTMF.

At step 440, the plurality of video frames and the plurality of audio frames are encoded into the second video streaming protocol without transcoding the plurality of video frames to form a new plurality of data packets encoded according to the second video streaming protocol. In other words, the video frames remain in the same content protocol, but are wrapped in a different communication protocol. For example, the video frame encoded in the VP8 protocol may be extracted from a data packet encoded in RTP and then encoded in a WebRTC data packet without changing the VP8 video frame.

Prior to encoding, the frames may be buffered and subjected to various quality improvement processes. For example, the frames or GOPs could be reordered into a temporally correct order. Missing frames could be identified and requested from the video source, if not present.

At step 450, the new plurality of data packets are output over the computer network to the client device.

Figure 5:
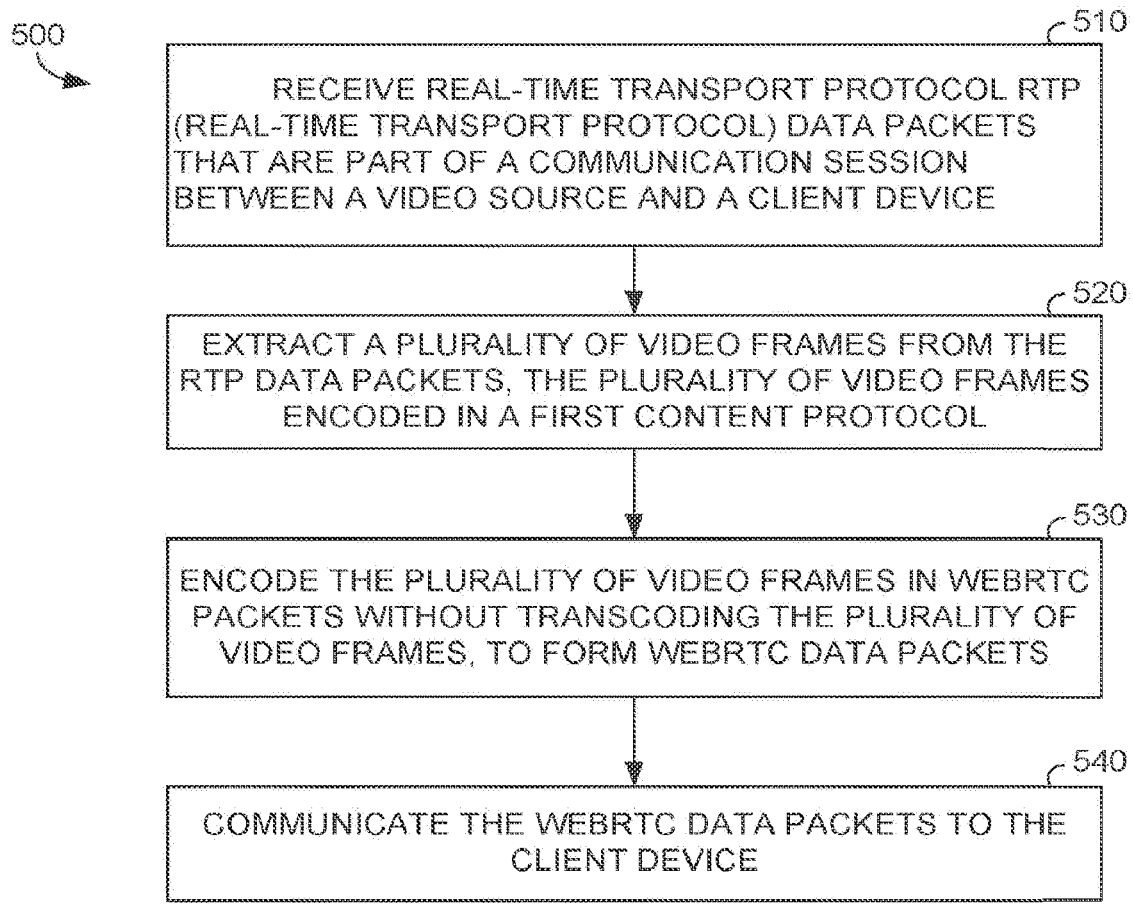
FIG. 5 is a diagram depicting a method of converting a media stream from a first streaming protocol to a second streaming protocol, in accordance with an aspect of the technology described herein.

Turning now to FIG. 5, a method 500 for converting a streaming video from a first video streaming protocol to a second video streaming protocol is provided, in accordance with an aspect of the technology described herein. Method 500 may be performed by stream converter 280.

At step 510, real-time transport protocol RTP (Real-Time Transport Protocol) data packets that are part of a communication session between a video source and a client device are received. The packets may be received by a stream converter 280. The stream converter may be located in a data center. The video source may be a camera or device having a camera, such as a doorbell. The computer network may be the Internet. The client device could be a smart phone, PC. TV, tablet, or the like.

At step 520, a plurality of video frames are extracted from the RTP data packets. The plurality of video frames are encoded in a first content protocol, such as H.261, H.263, H.264, HEVC, MPEG-1/MPEG-2, VP8, and VP9. The video frames may be grouped into a GOP of frames. The GOP can include i-frames, b-frames, and p-frames. When extracted the frames remain in the first content protocol, such as VP8.

At step 530, the plurality of video frames are encoded in WebRTC packets without transcoding the plurality of video frames, to form WebRTC data packets.

At step 540, the WebRTC data packets are communicated to the client device.

Figure 6:
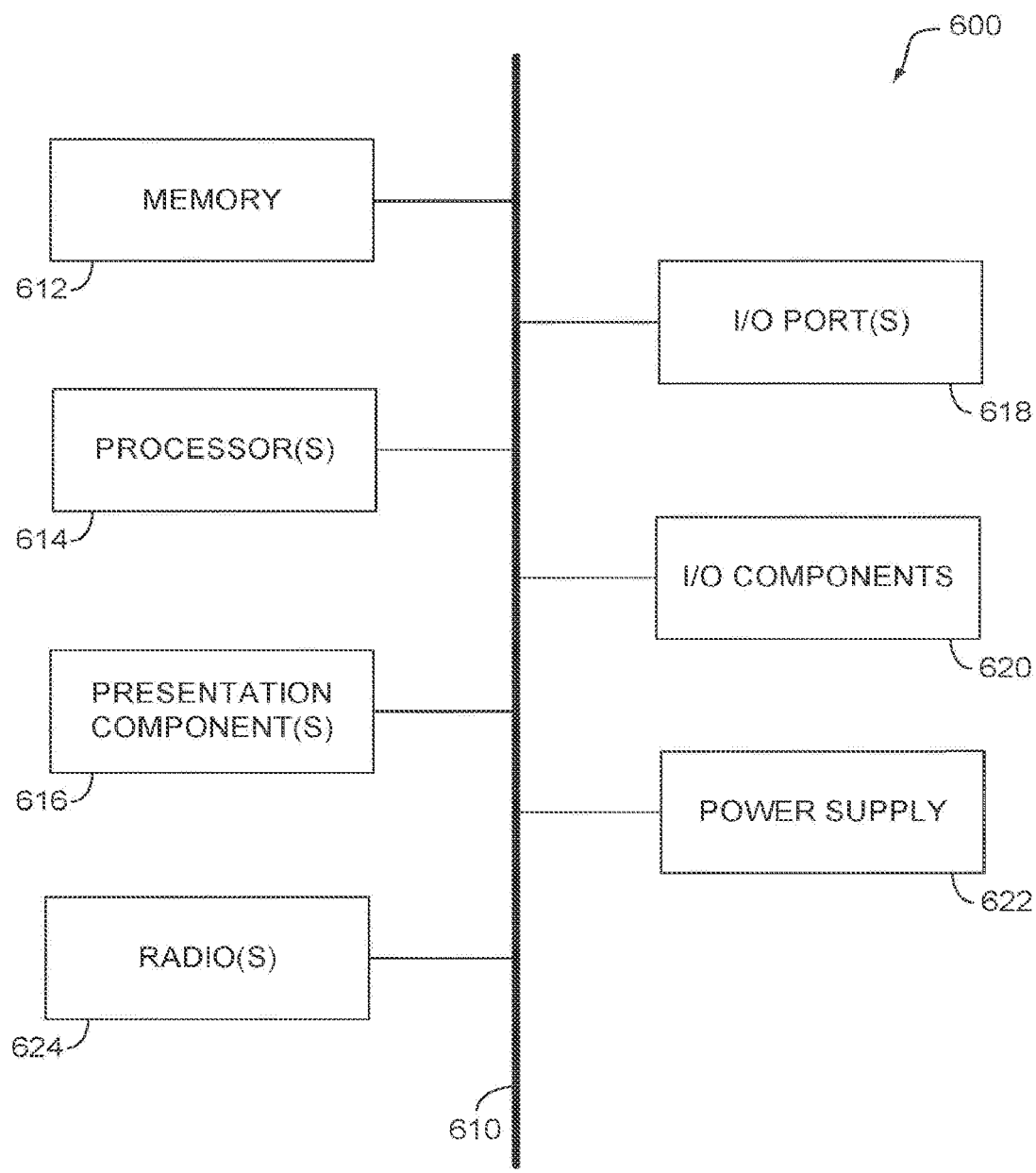
FIG. 6 is a block diagram of an exemplary computing environment suitable for use in implementing an aspect of the technology.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for converting a streaming video from a first video streaming protocol to a second video streaming protocol, the method comprising:

receiving at a server, from a computer network, a plurality of data packets encoded in the first video streaming protocol, the plurality of data packets being part of a communication session that transmits video content from a video source to a client device;

at the server, extracting a plurality of video frames from the plurality of data packets, the plurality of video frames encoded in a first content protocol;

at the server, storing the plurality of video frames in an input buffer and performing one or both of the following in the input buffer to produce a plurality of checked video frames: (i) performing a quality check to determine whether video frames that should be in the communication session are missing from the plurality of video frames, and (ii) temporally ordering the plurality of video frames;

at the server, encoding the plurality of checked video frames in the second video streaming protocol without transcoding the plurality of checked video frames, to form a new plurality of data packets encoded according to the second video streaming protocol with the plurality of checked video frames being in the first content protocol; and outputting from the server, over the computer network, the new plurality of data packets to the client device.

2. The method of claim 1, further comprising:

extracting a plurality of audio frames from the plurality of data packets, the plurality of audio frames encoded in a second content protocol;

encoding the plurality of audio frames within the new plurality of data packets in the second video streaming protocol.

3. The method of claim 2, further comprising synchronizing the plurality of video frames to the plurality of audio frames.

4. The method of claim 1, further comprising:

receiving at the server, over the computer network, a media control signal from the client device in a first signal protocol;

at the server, converting the media control signal from the first mat protocol to a second signal protocol; and outputting from the server, over the computer network, the media control signal to the video source in the second signal protocol.

5. The method of claim 4, wherein the new plurality of data packets outputted to the client device comprise a video stream and the media control signal pauses transmission of the video stream.

6. The method of claim 1, wherein the first and second video streaming protocols are each selected from the group consisting of WebRTC (Web Real-Time Communication) and RTP (Real-Time Transport Protocol).

7. The method of claim 1, wherein the plurality of video frames comprise i-frames and b-frames.

8. Non-transitory computer-readable storage media having computer-executable instructions for converting a streaming video from a first video streaming protocol to a second video streaming protocol stored thereon, wherein when executed by at least one processor the computer-executable instructions cause the at least one processor to:

receive at a server, from a computer network, a plurality of data packets encoded in the first video streaming protocol, the plurality of data packets being part of a communication session that transmits video content from a video source to a client device;

at the server, extract a plurality of video frames from the plurality of data packets, the plurality of video frames encoded in a first content protocol;

at the server, store the plurality of video frames in an input buffer and perform one or both of the following in the input buffer to produce a plurality of checked video frames: (i) perform a quality check to determine whether video frames that should be in the communication session are missing from the plurality of video frames, and (ii) temporally order the plurality of video frames;

at the server, encode the plurality of checked video frames in the second video streaming protocol without transcoding the plurality of checked video frames, to form a new plurality of data packets encoded according to the second video streaming protocol with the plurality of checked video frames being in the first content protocol; and output from the server, over the computer network, the new plurality of data packets to the client device.

9. The non-transitory computer-readable media of claim 8, wherein the computer-executable instructions further cause the at least one processor to— extract a plurality of audio frames from the plurality of data packets, the plurality of audio frames encoded in a second content protocol;

encode the plurality of audio frames within the new plurality of data packets in the second video streaming protocol.

10. The non-transitory computer-readable media of claim 9, wherein the computer-executable instructions further cause the at least one processor to synchronize the plurality of video frames to the plurality of audio frames.

11. The non-transitory computer-readable media of claim 8, wherein the computer-executable instructions further cause the at least one processor to— receive at the server, over the computer network, a media control signal from the client device in a first signal protocol;

at the server, convert the media control signal from the first signal protocol to a second signal protocol; and output from the server, over the computer network, the media control signal to the video source in the second signal protocol.

12. The non-transitory computer-readable media of claim 11, wherein the new plurality of data packets outputted to the client device comprise a video stream and the media control signal pauses transmission of the video stream.

13. The non-transitory computer-readable media of claim 8, wherein the first and second video streaming protocols are each selected from the group consisting of WebRTC (Web Real-Time Communication) and RTP (Real-Time Transport Protocol).

14. The non-transitory computer-readable media of claim 8, wherein the plurality of video frames comprise i-frames and b-frames.

15. A system for converting a streaming video from a first video streaming protocol to a second video streaming protocol, the system comprising one or more processors individually or collectively programmed to:

receive at a server, from a computer network, a plurality of data packets encoded in the first video streaming protocol, the plurality of data packets being part of a communication session that transmits video content from a video source to a client device;

at the server, extract a plurality of video frames from the plurality of data packets, the plurality of video frames encoded in a first content protocol;

at the server, store the plurality of video frames in an input buffer and perform one or both of the following in the input buffer to produce a plurality of checked video frames: (i) perform a quality check to determine whether video frames that should be in the communication session are missing from the plurality of video frames, and (ii) temporally order the plurality of video frames;

at the server, encode the plurality of checked video frames in the second video streaming protocol without transcoding the plurality of checked video frames, to form a new plurality of data packets encoded according to the second video streaming protocol with the plurality of checked video frames being in the first content protocol; and output from the server, over the computer network, the new plurality of data packets to the client device.

16. The system of claim 15, wherein the one or more processors are further individually or collectively programmed to— extract a plurality of audio frames from the plurality of data packets, the plurality of audio frames encoded in a second content protocol;

encode the plurality of audio frames within the new plurality of data packets in the second video streaming protocol.

17. The system of claim 16, wherein the one or more processors are further individually or collectively programmed to synchronize the plurality of video frames to the plurality of audio frames.

18. The system of claim 15, wherein the one or more processors are further individually or collectively programmed to— receive at the server, over the computer network, a media control signal from the client device in a first signal protocol;

at the server, convert the media control signal from the first signal protocol to a second signal protocol; and output from the server, over the computer network, the media control signal to the video source in the second signal protocol.

19. The system of claim 18, wherein the new plurality of data packets outputted to the client device comprise a video stream and the media control signal pauses transmission of the video stream.

20. The system of claim 15, wherein the first and second video streaming protocols are each selected from the group consisting of WebRTC (Web Real-Time Communication) and RTP (Real-Time Transport Protocol).

* * * * *